3,328,326
EMULSION COMPOSITIONS AND THEIR
PREPARATION
Webster M. Sawyer, Jr., Orinda, and Warren C. Simpson, El Cerrito, Calif., assignors to Shell Oil Company, New York, N.Y., a corporation of Delaware
No Drawing. Filed May 3, 1963, Ser. No. 277,704
9 Claims. (Cl. 260—27)

This invention relates to emulsion compositions and their preparation. More particularly, it relates to the application to essentially water-impermeable coatings to surfaces by means of wax-containing emulsions.

Petroleum-derived waxes have been used for many years to coat paper and carton boards especially for use in wrapping and containing dairy products and other food products such as bakery goods as well as for coating cloth, fibers, and food products including cheese and meats to render them moisture-vapor resistant. Such waxes, however, have an unfortunate tendency to crack and peel off the coated articles, especially when they are subjected to repeated flexing or severe creasing. Even waxes modified with polyethylene, while having some improved properties, show disadvantages relative to brittleness and lack of tensile strength particularly under low-temperature conditions.

In the last few years, the disadvantages which are normally attendant to the use of wax in coating applications have resulted in the significant supplanting of wax alone by the use of polymeric coatings, polyethylene in particular. In addition, polymeric wax reinforcing agents such as copolymers of ethylene and vinyl acetate in concentrations on the order of 20 to 30%, basis wax, have also been used to some extent in attempting to overcome the inadequacies of conventional petroleum waxes. Furthermore, copolymers of ethylene with $C_{3-8}$ olefins have been found to have quite excellent wax reinforcing properties.

However, the use of wax reinforced with polymers or copolymers, as well as the use of neat polymers, has not been completely satisfactory because of the viscosity characteristics of such materials. More specifically, it has been found that most polymer-reinforced waxes or neat polymers, suitable for coatings, have considerably higher melting points than the waxes which they were intended to replace. This means, of course, that higher temperatures must be employed to obtain proper viscosity for their use in conventional coating equipment. The disadvantageous high viscosity in polymer wax melts is a consequence of the high molecular weight of the polymers which is required to maintain satisfactory coating properties. For example, in a wax-polymer mixture containing 30% polymer, the following effects were observed by varying the inherent viscosity of the polymer:

| Inherent Viscosity of Polymer | Tensile Strength, p.s.i. | Percent Elongation |
|---|---|---|
| 1.8 | 350 | <50 |
| 2.6 | 2,500 | 700 |

These data illustrate that the disadvantage of high viscosity in wax-polymer melts cannot be alleviated merely by reducing the molecular weight of the polymer without serious degradation of tensile strength and extensibility. Furthermore, in many instances, it is found that substitutes of the type under consideration here have high melt indices. As used here the term "melt index" refers to a measure of the extension rate of the material through a given orifice under specified temperature and constant load (shear rate) conditions. (Refer to ASTM procedure 1238–57.) The significance of this is that comparatively small variations in temperature of such molten polymer or wax/polymer mixtures result in great variations in viscosity and flow characteristics, which in turn upset the delicate balance of operating variables so necessary to the successful coating of substrates on a commercial scale. Thus the coating of materials with polymer-containing coatings almost invariably involves higher heating costs and modification of the coating equipment to facilitate its use at higher melt temperatures. Furthermore, more precise means of controlling the temperature in both the melt and application stage of the coating operations may also be required, which contributes to the still higher cost of coating equipment for such materials. Still further, the prolonged exposure to high temperatures may lead to undesirable thermal decomposition. Thus, if a stable emulsion of a particular coating material can be produced, the necessity for heating to high temperatures and the problems attendant thereto would be virtually eliminated.

It is therefore an object of this invention to provide improved wax-polymer emulsion compositions suitable for applying substantially water-impermeable coatings to porous substrates. It is a particular object of the invention to provide improved wax-high molecular weight polymer emulsion compositions suitable for coatings to fibrous materials such as paper and carton boards, and further to provide a process for the manufacture of such compositions.

The wax-polymer emulsion based coatings, with which the invention is concerned, comprise petroleum wax and copolymers of ethylene with at least one higher alkene, especially propylene. The emulsions of the invention therefore consist essentially of a continuous phase of water, and a discontinuous (dispersed) phase of wax-polymer particles, the surfaces of which had adsorbed thereon a surfactant compound.

The polymeric portion of the dispersed wax-polymer particle consists of certain polymers having the general linear configuration

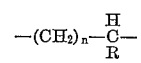

wherein $n$ is an average integer between about 10 and about 50 (preferably 10–40), R is a hydrocarbyl radical having 1–16 carbon atoms and the unit $(CH_2)_n$ is an unbranched hydrocarbon chain, the average molecular weight of the copolymers being up to about 5 million, usually between about 20,000 and 800,000 (preferably 200,000–400,000). Expressed as intrinsic viscosity, copolymer intrinsic viscosities of between about 1.0 and 6.0 enhance the physical properties of petroleum waxes, providing wax compositions with unexpectedly improved toughness, flexibility, tensile strength, elongation, resistance to cracking at low temperatures, and other desirable properties. Copolymers containing as low as 60 moles of ethylene per 100 moles of total alkene can be employed in the emulsions of the invention. However, the polymers are preferably copolymers of 80–95 moles of ethylene with 20–5 moles of a $C_{3-18}$ alpha-alkene and the intrinsic viscosity of the copolymer is between about 2 and 5. Still more preferably, the copolymers are those formed between 85–93 mole percent of ethylene and 15–7 mole percent of a $C_{3-8}$ alpha-olefin.

The polymers utilized in the compositions of this invention are preferably prepared by copolymerizing a mixture of ethylene and a higher alpha-alkene, preferably having from 3–8 carbon atoms per molecule but which may have as many as 18 carbon atoms per molecule. The most effective alpha-olefins for this purpose are propylene and butene-1, although higher alkanes such as octene-1 or octadecene-1 may be utilized in place of or in addition to the lower alpha-olefins.

While the process of forming the copolymers does not form a part of the present invention, the copolymers may be prepared by well known procedures, such as catalytic polymerization. The proportion of catalyst should be in the order of 0.01–1%, the polymerization being carried out in an inert solvent such as an alkane (cyclohexane). Polymerization in this manner is normally conducted under low pressures in the order of 1–30 p.s.i.g. and temperatures of 0–100° C. for a time of 1–5 hours.

Catalytic systems which may be used include combinations of aluminum alkyl chlorides such as aluminum diethyl monochloride with trialkyl vanadates, exemplified by triisobutyl vanadate, or "ethyl aluminum sesquichloride" $(Al)_2(C_2H_5)_3Cl_3$. Other vanadates include tri-secondary butyl vanadate or mixed isopropyl secondary butyl vanadates.

Polymers having the general formula

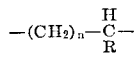

may be prepared by other means, such as copolymerization of unsubstituted diolefins, such as butadiene, with alkyl-substituted diolefins, such as isoprene, and hydrogenation of the copolymer to eliminate any remaining unsaturated linkages. Hydrocarbyls other than alkyls are obtained by the use of styrene or alkylated styrenes in place of $C_{3-20}$ aliphatic olefins.

The density of the copolymers may be varied over a considerable range, usually between about 0.85 to about 1.0, low density copolymers being regarded as those having densities in the order of 0.85 to about 0.91 and high density materials being regarded as those having densities from the latter upper limit to about 1.0. Advantages are gained by the combination of several different degrees of high and low density and/or high and low molecular weight insofar as increase in low temperature properties without a corresponding increase in brittleness being experienced.

The precise mol ratio of ethylene to higher alkene will depend in a large part upon the exact type of wax being modified with the copolymer. It appears to be necessary or at least highly desirable to coordinate the unbranched chain length of the individual wax molecules with the unbranched chain length of the polymer employed. The degree of branching in the copolymer is established by the mol ratio of ethylene to higher alkene. Since petroleum waxes contain a spectrum of wax species, it is desirable to have a limited spectrum of unbranched chain units in the copolymer to coordinate with the several wax species present in the normal petroleum wax. An example of such a wax spectrum is to be found in the figures of Arabian patent, U.S. 2,915,447, and in Table II of said patent. Therein it will be seen that a paraffin wax having an average melting point of 123° F. contains about 86 mol percent of normal paraffins having from 22 to 27 carbon atoms per molecule. On the other hand, a paraffin wax having an average melting point of about 139° F. contains about 72 mol percent of waxes having from 26 to 31 carbon atoms per molecule.

The waxes which may be modified with the subject copolymers are petroleum waxes referred to in the art as paraffin wax or as microcrystalline wax. Microcrystalline wax is also known as amorphous wax and is obtained by the dewaxing of residual lubricating oils while the paraffin waxes are usually obtained by the dewaxing of distillate lubricating oil fractions. Distillate paraffin waxes usually have melting points between about 120° F. and about 145° F., preferably between about 125 and 140° F. Microcrystalline waxes which contain only minor amounts of normal paraffins and largely predominate in highly branched and naphthenic waxes have melting points in the order of 130–160° F., usually between 140 and 150° F.

The higher melting point paraffin waxes are especially useful in many coating wax compositions: heavy distillate waxes obtained from the highest boiling distillate lubricating oil fractions by dewaxing have melting points in the order of 145 and 185° F., as does the high melting point paraffin wax split from microcrystalline wax by fractional crystallization.

Special waxes may be obtained in particular instances, such as the plastic wax obtained by the deoiling of soft wax fractions which normally are separated from paraffin waxes during deoiling and dewaxing procedures. These plastic waxes are useful for their extreme flexibility and, while useful for this particular property, are especially subject to being fortified with respect to blocking and tensile strength as well as toughness by incorporation with the subject copolymers.

It is normal experience in designing wax coating compositions to find it necessary to combine several waxes together in a single composition. The purpose of this, of course, is to obtain the beneficial properties inherent in each particular type of wax or to minimize adverse properties of other waxes so included.

In order for the coatings which are prepared from the emulsion of this invention to have maximum toughness and extreme flexibility as well as other corresponding properties, various proportions of any of the wax components may be replaced with copolymer, preferably a copolymer having an average molecular weight about 50–500 times the average molecular weight of the wax composition. Suitable compound waxes of this category may have the following compositions:

| | Percent weight |
|---|---|
| Paraffin wax, 122–142° F. melting point | 40–60 |
| Heavy distillate wax, 142–185° F. melting point | 5–10 |
| Microcrystalline wax, 130–160° F. melting point | 5–15 |
| Plastic wax | 0–20 |
| High melting paraffinic wax, 180+° F. melting point | 0–70 |
| Copolymer | 5–50 |

The disperse phase of the emulsions of the invention comprise substantial proportions of the copolymer with wax, i.e., 40–95% by weight of petroleum wax modified with 5–60% by weight of copolymer. Such compositions containing from 67–77% wax and 33–23% copolymer have been found to have especially good properties and are therefore preferred.

The methods of compounding the wax and polymer for use in the preparation of emulsions, though not critical per se, is nevertheless important and must be performed with a view toward complete homogeneity of the wax and the polymer.

Probably the simplest method is by heating and stirring the several components until a single phase melt is obtained.

Another method of compounding the wax-polymer compositions may be referred to as "mill mixing." In this method, the copolymer is heated on a compounding roll or a set of rolls and the wax is added while the copolymer is being rolled. The temperature is gradually lowered to obtain an essentially solid composition when the temperature is sufficiently reduced. An improvement on this comprises the so-called "extrusion mixing" of compositions prepared by any of the above methods whereby the composition is subjected to extrusion pressures which cause greater intermixing than can be obtained by the method just described.

Another method of dispersing the copolymer in wax, a preferred method, in fact, comprises forming a solution of the copolymer in a relatively volatile solvent, such as cyclohexane, benzene (or a chlorinated hydrocarbon solvent) and adding molten wax or a solution of wax thereto. This method produces homogeneous compositions easily and does not subject the components to the adverse effect of prolonged high temperature. Another preferred procedure is to dissolve the wax into the polymer reaction solution as described hereinbefore. As used herein, the term "relatively volatile solvent" refers to a normally liquid organic solvent having a boiling point no higher than about 110° C., and preferably no higher than about 100° C.

However, regardless of the particular mixing scheme used, for best results the wax and copolymer must be in a completely homogeneous state. That is to say, both the wax-polymer mixture and the subsequently prepared emulsion must not contain discrete particles of either wax or polymer. Moreover, as will be evident from the discussion following, the preparation of aqueous emulsions therefrom is conducted in a manner so as to avoid any change in the homogeneity of the wax-polymer mixture.

To stabilize the emulsions of the invention, any one of the three basic types of emulsion stabilizers (emulsifiers) may be employed, viz. anionic, cationic or non-ionic. However, regardless of which type is used it is important that the hydrophile-lipophile balance (HLB) be such that the emulsifier is at least moderately hydrophilic and preferably strongly hydrophilic. More particularly, it is necessary that the emulsifier have an HLB number of 8 to 30 and preferably at least 10. In using the concept of HLB numbers above, reference is made to the work of W. C. Griffin reported in J. Soc. Cosmetic Chemists, 1, 311 (1949). However, in addition to the experimental procedures outlined there, additional reference is made to less complicated procedures for estimating HLB numbers such as those reported by Griffin in J. Soc. Cosmetic Chemists, 5, 249 (1954) and Offic. Dig. Federation Paint and Varnish Production Clubs, 28, 466 (1956). Examples of suitable emulsifiers having an HLB. number of at least 8 are listed below. The letter following each denotes the type of emulsifier (N: nonionic, C: cationic, A: anionic):

Polyoxypropylene stearate (N)
Sorbitan monolaurate (N)
Hexaethylene glycol monostearate (N)
Polyoxyethylene monooleate (N)
Polyoxyethylene allyl phenol (N)
Polyoxyethylene sorbitan monolaurate (N)
Potassium oleate (A)
Sodium lauryl sulfate (A)
N-cetyl N-ethyl morpholinium ethosulfate (C)
Stearyl diethylethanol amine (C)
Sodium stearate (A)
Oleyl triethanol amine (C)

The concentration of emulsion stabilizer required for the invention varies rather widely and depends entirely upon the particular emulsifier which is used. However, in order to prevent reduction in the strength of the films laid down from such emulsions, it has been found necessary to employ emulsification stabilizer having a critical micelle concentration (C.M.C.) of not more than about 5.0% by weight based on the water. Consequently, it is preferred that the amount of emulsifier remaining in the continuous phase upon formation of the emulsion be no greater than about the C.M.C. of the emulsifier, and in no event greater than 5.0% by weight based on the water. As little as 0.01% by weight of the emulsifier can be used to stabilize the emulsions of the invention; however, it is preferred to use at least 0.5%. Still better results are obtained with most emulsion stabilization agents if at least 1% is used. It will, of course, be recognized that the total amount of emulsifier in the disperse and continuous phase will be a function of the number and size of the dispersed particles and the cross-sectional area of the adsorbed (lypophilic) portion of the emulsion stabilizer.

While the unique wax-polymer emulsions are one aspect of the invention, still another aspect is the processing scheme which is preferably followed in order to obtain wax-copolymer emulsions having satisfactory coating properties. The process comprises four steps, which will be discussed in the order of their sequence: (1) Preparation of separate liquid phases; (2) emulsification of the liquid phases; (3) solvent removal; and (4) concentration of the emulsions.

PREPARATION OF SEPARATE LIQUID PHASES

In order to obtain adequate dispersion and emulsion stability, it is necessary that the wax-copolymer be dispersed initially in a liquid phase. To do this, the wax and polymer either together or separately must be dissolved in a mutual solvent. Especially suitable for this purpose are $C_6$ solvents such as cyclohexane, benzene, and n-hexane. In order to facilitate solution of the wax and polymer as well as to reduce the viscosity of the solution, it will generally be preferred to heat the solution. In this regard, it is essential that the polymer, regardless of its molecular weight, be truly dissolved in the solvent. Mere dispersion of the highly swollen polymer in the form of, say, slimy gelatinous masses is not adequate. The amount of solvent is not particularly critical except insofar as the resultant solution (cement) containing at least 1% wax-polymer must be readily pumpable within the temperature range of from about 50–80% C.

To the water, which will form the continuous phase of the emulsion, is added the emulsifier. Because of its relatively high HLB number, it is readily soluble in the water and no particular mixing problems are involved.

EMULSIFICATION OF THE TWO LIQUID PHASES

Emulsification of the two liquid phases may be accomplished by any of the conventional means, i.e., by simple mixers, homogenizers, colloid mills or by ultrasonic devices. One important factor in the selection of emulsifiers useful in the process is that the energy of mixing imparted to the liquids be sufficient to form disperse phase liquid particles having a weight median particle size of less than 5 microns. It is preferred that the disperse phase weight mean particle size be between 0.5 and 1.0 micron.

Through the actual method of emulsification may be varied widely, it is essential that the emulsion of the two liquids at all times be maintained at a temperature of between 50° C. and the boiling point of the organic solvent in order to prevent the formation of coagulum on the surface of the emulsion. The term "coagulum" as used here refers to macro sized particles of coagulated disperse phase, which may have the appearance of lumps or sometimes a rag.

SOLVENT REMOVAL

Removal of the solvent in which the wax-polymer mixture is dissolved is accomplished easily by merely heating the emulsion to or near the boiling point of the solvent, which, with the wax and polymer dissolved therein, comprises the disperse phase of the emulsion. Vaporization of the solvent is normally accompanied by boiling of the solvent and the formation of a foam atop the liquid. The foaming has been found to be of no harm and need not be avoided, since no significant amount of coagulum is formed therein. It has been found, however, that in the removal of the solvent it is necessary to avoid sudden pressure surges, i.e., sudden increases in pressure. More specifically, it has been found that pressure surges of greater than about 5 p.s.i. per second result in the formation of excessive amounts of coagulum. Thus freedom from pressure surges is a critical limitation upon the solvent-removal step of this process.

CONCENTRATION OF THE EMULSION

Depending upon the particle size of the wax-polymer particles which remain dispersed after solvent removal, the wax polymer emulsion of this invention is self-creaming to some extent. That is to say, upon standing for as little as several hours or more, the emulsion separates without further treatment into two emulsions, an upper rich emulsion layer which has a higher concentration of disperse phase and lower poor emulsion layer which has a disperse phase concentration which is less than that of the uncreamed emulsion. Both are, however, stable emulsions. Because of this self-creaming effect, it is therefore not usually necessary to concentrate the emulsions further by, for example, centrifugation but only to decant the upper emulsion from the lower.

The unique properties of the emulsions of the invention and the preferred process for preparing them will be better understood by reference to the examples which follow:

Example I

Several wax-polymer emulsions were prepared to observe the effect of different operating variables—solids content, solvent phase ratio, and addition of co-emulsifier—on the stability of the resultant emulsions and their freedom from coagulation upon stripping. Each of the emulsions was prepared as follows:

(1) Two percent by weight of a potassium salt of rosin acids was added to the water to be used in the emulsion. The pH of the resultant solution was adjusted to 11.2 by the addition of potassium hydroxide.

(2) The solution of the rosin acid salt in water was then added to a solution of the wax-polymer mixture in a hydrocarbon solvent. In some of the tests, an additional emulsion stabilizer was added to the wax-polymer solution prior to addition of the water. The mixture of water and wax-polymer solution was then emulsified by continuously circulating the two liquid phases with a gear pump through a conduit containing a Globe valve and an orifice at the point of return to the original container. The purpose of the Globe valve is, of course, to adjust the pressure drop in the system, by which means processing variables such as the degree of emulsification can be controlled. The temperature of the components and the emulsion was maintained at 65–70° C. throughout the emulsification step. The emulsion was then stripped of solvent by boiling off the solvent at a tempersature of 50–70° C., the pressure of the system varying from a maximum one atmosphere to a low of about 20 in. Hg vacuum at the end of the stripping operation. The desolventized emulsion was then allowed to stand and was cooled to room temperature. Upon standing, each of the emulsions, creamed to form an upper emulsion layer, containing from 20 to 35% by weight solids.

The copolymer employed in each test was ethylene-propylene copolymer having an intrinsic viscosity of 2.2, the ethylene to propylene ratio of which was 9 to 1. The wax-polymer mixture contained 70% residual paraffinic wax and 30% copolymer.

The results were as follows:

| Percent wt. Solids in Creamed Rich Emulsion | Cement | | Percent Non-ionic Emulsifier | Phase Ratio, gram hydrocarbon per gram of $H_2O$ | Coagulation |
|---|---|---|---|---|---|
| | Percent Wax-Polymer | Solvent | | | |
| 34 | 10 | Benzene | | 0.75 | None. |
| 22 | 15 | ----do---- | | 0.75 | Do. |
| -------- | 7 | Cyclohexane | 0.5 | 0.72 | Do. |
| -------- | 5 | Cyclohexane +Benzene. | 0.5 | 1.0 | Do. |

When samples of the above emulsions were withdrawn and cooled before removal of the solvent, excessive coagulum was formed unexpectedly on the surfaces thereof, thus indicating the necessity for continued heating between the emulsification and stripping steps.

Example II

Two wax-polymer emulsions having solids contents of 20% and 33.5% were prepared by the procedure of Example I, using a wax-polymer mixture having the same composition and physical characteristics as in Example I. Four sheets of paper board having an average thickness of 0.016 inch and a water content of 3–6% were each dipped a single time for 20–30 seconds into the emulsion containing 20% solids, and four sheets having the same properties were likewise dipped into the emulsion containing 33.5% solids. Because of variations in the thickness of the paper board samples (±10%) the amount of wax-polymer coated thereon was determined by three methods: (a) by differential weight of the board after equilibration at 90° C. for 30 minutes and 15 minutes in a constant temperature room; (b) by differential weight of the board after the above equilibration plus several days in the constant temperature room; and (c) by differential weight from the emulsion pickup and known solids content of the emulsion. The results of this coating test were as follows:

| Sample No. | Film Weight (mg./cm.$^2$) | | | Solids Content of Emulsion, Percent wt. |
|---|---|---|---|---|
| | Method a | Method b | Method c | |
| 1 | 1.9 | -------- | 1.9 | 20 |
| 2 | 1.8 | 1.6 | 1.5 | |
| 3 | 1.9 | 1.7 | 1.7 | |
| 4 | 1.8 | 1.1 | 2.1 | |
| Average | 1.8 | 1.4 | 1.8 | |
| 5 | 4.4 | 4.8 | 4.9 | 33.5 |
| 6 | 4.6 | 4.8 | 5.4 | |
| 7 | 3.6 | 4.0 | 4.4 | |
| 8 | 3.6 | 4.1 | 4.2 | |
| Average | 4.0 | 4.4 | 4.7 | |

Both the thinner film from the 20% emulsion and the thicker film from the 33.5% emulsion had a high gloss. They likewise had good adhesion to the paper board in that attempts to pull the film from the board resulted in tearing of the paper surface. The films all had good heat-sealing properties as exhibited by the fact that when heat-sealed samples were peeled apart, the break occurred in the paper not the film. Furthermore, the samples when creased revealed no cracks or breaks in the film.

The surprisingly favorable low water vapor permeability of coatings laid down for the emulsions of the invention, as compared with conventional extruded coatings, is illustrated by the following example:

Example III

Two emulsions, one containing 19.0% solids and the other 24.3% solids, were employed to dip coat separate panels of 16 mil milk carton paperboard stock. The emulsions were prepared in the manner of Example I using the same emulsifier and the same relative wax-polymer composition. The two dip-coated panels were dried at 90° C. for 30 minutes. The water-vapor transmission of the dip-coated panels was then determined and compared with the two separate samples of the paperboard stock which had been coated with the same wax-polymer composition by means of a conventional hot melt extrusion coater. The results were as follows:

| Sample | Solids Deposited, mg./cm.$^2$ | $H_2O$ Vapor Transmission, mg./hr. |
|---|---|---|
| Uncoated board | None | 50–100 |
| Extrusion-coated board | 2.5 | 0.9 |
| Emulsion-coated board: | | |
| (a) 19.0% solids | 2.7 | 1.4 |
| (b) 24.3% solids | 5.1 | 0.3 |

The data indicate that the emulsion-derived coatings, none of which was hot-rolled or otherwise finished to decrease porosity, were quite comparable to conventional extrusion coatings of the same wax-polymer blend.

The invention is still further illustrated by the following example in which the emulsification step and particle size distribution of the resultant emulsions are set forth.

*Example IV*

Starting with a 10% by weight soluiton of wax and polymer in solvent, a large number of separate emulsions were prepared, using the same apparatus described in Example I and the following procedure:

(1) Two percent by weight of a potassium salt of rosin acids, known by the tradename "Dresinate 214," was added to the water to be used in the emulsion, and the pH thereof was adjusted to 11.2 by addition of aqueous potassium hydroxide.

(2) The aqueous solution of rosin acid salt was then added to a solution of 70% paraffinic residual wax and 30% ethylene-propylene copolymer (intrinsic viscosity 2.2, 90% ethylene monomer units) dissolved in hydrocarbon solvent, and the solutions premixed by circulating through the apparatus without any substantial back pressure on the Globe valve.

(3) All of the premixtures were then mixed more intimately by extended premixing and/or by circulation through the system at one or more back-pressure levels. The temperature of the emulsions during the premixing and emulsification steps was 62–69° C. The emulsions were stripped of solvent at 50–60° C. at pressures varying in each case from an initial pressure of 1 atmosphere to a final pressure of 21 inches Hg vacuum. Each of the emulsions was then analyzed as to particle size distribution.

separate samples of each emulsion. The results were as follows:

| Solids Content (percent by wt.) | 15 | 20 | 25 | 30 | 36 |
|---|---|---|---|---|---|
| Viscosity, centipoises: | | | | | |
| Wax-polymer* emulsion | 3 | 3.4 | 5 | 12 | 27 |
| Wax-polymer* emulsion plus 0.05% silicone oil | 2.5 | 3 | 4 | 8 | 22 |

*30% Ethylene-propylene copolymer, I.V.=3.0, 90% ethylene 70% Petroleum wax (50% distillate wax, 50% residual wax).

The data indicate that the emulsions of the invention do indeed have low viscosity and are easily pumpable at solids concentrations as high as 50–60% by weight.

In each of the experimental examples discussed herein, the emulsion stabilizer had an H.L.B. number of over 20 and a critical micelle concentration of about 1.2% by weight. It will, however, be recognized by anyone skilled in the art of surface chemistry that within the H.L.B. and critical micelle concentration limitations discussed hereabove, the surfacants suitable for the compositions of the invention are numbered in the hundreds and that the foregoing examples are therefore not limiting in this regard.

As will be recognized by anyone skilled in the art, the final product of the invention is not, strictly speaking, an emulsion. It is a stable dispersion of solid particles in water. However, because (1) it is prepared by way of a true emulsion and (2) because of the common commercial usage of the term "emulsion" as applied to stable dispersions of wax in water, usage of the term "emulsion" is retained here.

We claim as our invention:

1. A stable oil-in-water emulsion consisting essentially

| Solvent | Premix Time (minutes) | Emulsification Time (minutes) at Indicated Back Pressure and Sequence | | | Disperse Phase | | |
|---|---|---|---|---|---|---|---|
| | | 20 p.s.i.g. | 70 p.s.i.g. | 20 p.s.i.g. | Weight Medium Particle Size (μ) | Percent wt. Smaller than 0.53μ | Percent wt. Larger than 6.9μ |
| Cyclohexane | 5 | 0 | 0 | 0 | 0.25 | 0.2 | 49 |
| | 7 | 5 | 5 | 5 | 0.68 | <0.9 | 0 |
| | 5 | 10 | 0 | 0 | 0.92 | 0.8 | 0 |
| | 5 | 15 | 0 | 0 | 0.88 | 0.4 | 5.7 |
| | 5 | 0 | 5 | 0 | 0.80 | 0 | 12.7 |
| | 5 | 0 | 10 | 0 | 0.67 | 0 | 5.7 |
| | 5 | 0 | 15 | 0 | 0.64 | 0 | 25.3 |
| | 25 | 0 | 0 | 0 | 1.10 | 1.8 | 0 |
| Benzene | 5 | 5 | 5 | 5 | 0.7 | 38 | <0.4 |
| | 25 | 0 | 0 | 0 | 0.8 | 39 | 0 |
| | 5 | 10 | 0 | 0 | 1.0 | 34 | 0.5 |
| | 5 | 15 | 0 | 0 | 1.0 | 37 | 0 |
| | 5 | 0 | 10 | 0 | 0.6 | 46 | 0.6 |
| | 5 | 0 | 15 | 0 | | 50 | 0 |

These data indicate that wide variations in particle size distribution may be obtained by relatively minor changes in the emulsification step. It will, of course, be recognized that the use of back pressure in the manner of this example to vary the degree of emulsification through a valve is applicable to any circulatory system containing a constriction and can therefore be used with conventional closed mixing devices such as colloid mills, homogenizers and the like.

*Example V*

Using a 10% by weight solution of wax and polymer in cyclohexane, several emulsions of different solids content were prepared in the manner of Example I in order to observe the effect of solids concentration upon viscosity. The various solids contents were obtained by regulating the time of creaming of each emulsion. In addition, in order to observe the effect, if any, of anti-sticking agents, 0.05% of a commercial silicone oil was added to of (a) a continuous phase of water having dissolved therein an emulsion stabilization agent having an HLB number of from 8 to 30 inclusive and a concentration of 0.01% to 5.0% by weight, basis water, and (b) a dispersed phase consisting essentially of particles of a homogeneous mixture of 67–77% by weight of a petroleum wax and 23–33% by weight of a copolymer of ethylene and a higher alpha olefin having from 3 to 18 carbon atoms per molecule, the mole ratio of ethylene to higher alpha olefin being from about 1.5:1 to about 19:1, said polymer having an intrinsic viscosity of 2–5.

2. The emulsion of claim 1 in which the mole ratio of ethylene to higher alpha olefin in the copolymer is from about 4:1 to about 19:1.

3. The emulsion of claim 1 in which the stabilization agent is a potassium salt of rosin acids.

4. A process for the preparation of stable oil-to-water type of emulsions consisting essentially of (a) a continuous phase of water having dissolved therein an emulsion stabilization agent having a HLB number of from 8 to 30 inclusively and a concentration of 0.01% to 5.0% by weight, basis water, and (b) a dispersed phase consisting essentially of particles of a homogeneous mixture of 67–77% by weight of a petroleum wax and 23–33% by weight of an ethylene-higher alpha olefin copolymer, the mole ratio of ethylene to higher alpha olefin being from about 1.5:1 to about 19:1, said polymer having an intrinsic viscosity of 2–5, comprising the sequence of steps:
(1) admixing water, to which has been added the emulsion stabilization agent, with a liquid solution of the homogeneous mixture of wax and copolymer in a volatile organic solvent, having a boiling point no higher than 110° C., said solution being essentially water-immiscible;
(2) emulsifying the immiscible liquid solution with the water, thus dispersing the solution throughout the water in the form of liquid particles having a weight mean particle size of between 0.1 and 5 microns, at a temperature between 50° C. and the boiling point of the organic solvent, and maintaining the resultant emulsions within the aforesaid temperature range;
(3) removing the organic solvent from said heated emulsion by vaporization thereof while maintaining positive pressure changes below about 5 p.s.i. per second;
(4) maintaining the desolvenized emulsion in a quiescent state for formation of an upper rich emulsion layer and a lower poor emulsion layer, and
(5) separately recovering said upper rich emulsion layer.

5. The process of claim 4 in which the mole ratio of ethylene to higher alpha olefin in the copolymer is from about 4:1 to about 19:1.

6. A process for the preparation of stable oil-in-water type of emulsions consisting of (a) a continuous phase of water having dissolved therein an emulsion stabilization agent having an HLB number of from 8 to 18 inclusively and a concentration of 0.01% to 5.0% by weight, basis water, and (b) a dispersed phase consisting essentially of particles of a homogeneous mixture of 67–77% by weight of a petroleum wax and 23–33% by weight of an ethylene-higher alpha olefin copolymer, the mole ratio of ethylene to higher alpha olefin being from about 1.5:1 to about 19:1, said polymer having an intrinsic viscosity of 2–5, said particles having the emulsion stabilization agent of the foregoing composition adsorbed on substantially the entire surface thereof, comprising the sequence of steps:
(1) admixing water, to which has been added the emulsion stabilisation agent, with a liquid solution of the homogeneous mixture of wax and copolymer in a volatile organic solvent having a boiling point no higher than 100° C., said solution being essentially water-immiscible;
(2) emulsifying the immisible liquid solution with the water, thus dispersing the solution throughout the water in the form of liquid particles having a weight mean particle size of between 0.1 and 5 microns, at a temperature between 50° C. and the boiling point of the organic solvent, and maintaining the resultant emulsion within the aforesaid temperature range;
(3) removing the organic solvent from said heated emulsion by vaporization thereof in the absence of any positive pressure changes greater than about 5 p.s.i. per second;
(4) subjecting said desolventized emulsion to centrifugation and partial removal of water therefrom; and
(5) separately recovering a higher emulsion phase enriched in solids content.

7. A stable oil-in-water emulsion consisting essentially of (a) continuous phase of water having dissolved therein an emulsion stabilization agent having an HLB number of from 8 to 30 inclusive and a concentration of 0.01% to 5.0% by weight, basis water, and (b) a dispersed phase consisting essentially of particles of a homogeneous mixture of 40–95% by weight of a petroleum wax and 5–60% by weight of a copolymer of ethylene and a higher alpha olefin having from 3 to 18 carbon atoms per molecule, the mole ratio of ethylene to higher alpha olefin being from about 1.5:1 to about 19:1, said polymer having an intrinsic viscosity of 1–6.

8. A process for the preparation of stable oil-to-water type of emulsions consisting essentially of (a) continuous phase of water having dissolved therein an emulsion stabilization agent having an HLB number of from 8 to 30 inclusively and a concentration of 0.01% to 5.0% by weight, basis water, and (b) a dispersed phase consisting essentially of particles of a homogeneous mixture of 40–95% by weight of a petroleum wax and 5–60% by weight of an ethylene-higher alpha olefin copolymer, the mole ratio of ethylene to higher alpha olefin being from about 1.5:1 to about 19:1, said polymer having an intrinsic viscosity of 1–6, comprising the sequence of steps:
(1) admixing water, to which has been added the emulcion stabilization agent, with a liquid solution of the homogeneous mixture of wax and copolymer in a volatile organic solvent, having a boiling point no higher than 110° C., said solution being essentially water-immiscible;
(2) emulsifying the immiscible liquid solution with the water, thus dispersing the solution throughout the water in the form of liquid particles having a weight mean particle size of between 0.1 and 5 microns, at a temperature between 50° C. and the boiling point of the organic solvent, and maintaining the resultant emulsions within the aforesaid temperature range;
(3) removing the organic solvent from said heated emulsion by vaporization thereof while maintaining positive pressure changes below about 5 p.s.i. per second;
(4) maintaining the desolventized emulsion in a quiescent state for formation of an upper rich emulsion layer and a lower poor emulsion layer, and
(5) separately recovering said upper rich emulsion layer.

9. A process for the preparation of stable oil-in-water type of emulsions consisting of (a) a continuous phase of water having dissolved therein an emulsion stabilization agent having an HLB number of from 8 to 18 inclusively and a concentration of 0.01% to 5.0% by weight, basis water, and (b) a dispersed phase consisting essentially of particles of a homogeneous mixture of 40–95% by weight of a petroleum wax and 5–60% by weight of ethylene-higher alpha olefin copolymer, the mole ratio of ethylene to higher alpha olefin being from about 1.5:1 to about 19:1, said polymer having an intrinsic viscosity of 1–6, said particles having the emulsion stabilization agent of the foregoing composition adsorbed on substantially the entire surface thereof, comprising the sequence of steps:
(1) admixing water, to which has been added the emulsion stabilization agent, with a liquid solution of the homogeneous mixture of wax and copolymer in a volatile organic solvent having a boiling point no higher than 100° C., said solution being essentially water-immiscible;
(2) emulsifying the immiscible liquid solution with the water, thus dispersing the solution throughout the water in the form of liquid particles having a weight mean particle size of between 0.1 and 5 microns, at a temperature between 50° C. and the boiling point of the organic solvent, and maintaining the resultant emulsion within the aforesaid temperature range;
(3) removing the organic solvent from said heated emulsion by vaporization thereof in the absence of any positive pressure changes greater than about 5 p.s.i. per second;
(4) subjecting said desolventized emulsion to centrifugation and partial removal of water therefrom; and (5) separately recovering a higher emulsion phase enriched in solids content.

References Cited

UNITED STATES PATENTS

| | | | |
|---|---|---|---|
| 2,764,499 | 9/1956 | Porter | 252—311 |
| 2,969,340 | 1/1961 | Kaufman et al. | 260—28.5 |
| 3,200,093 | 8/1965 | Sauer et al. | 260—28.5 |

OTHER REFERENCES

Schwartz et al.: "Surface Active Agents and Detergents," volume II (1958), page 347.

MORRIS LIEBMAN, *Primary Examiner.*

A. LIEBERMAN, *Assistant Examiner.*